US011294065B2

(12) United States Patent
Marmet

(10) Patent No.: US 11,294,065 B2
(45) Date of Patent: Apr. 5, 2022

(54) VISIBLE LIGHT COMMUNICATION BASED POSITIONING

(71) Applicant: CENTRE NATIONAL D'ETUDES SPATIALES, Paris (FR)

(72) Inventor: François-Xavier Marmet, Muret (FR)

(73) Assignee: CENTRE NATIONAL D'ETUDES SPATIALES, Paris (FR)

(*) Notice: Subject to any disclaimer, the term of this patent is extended or adjusted under 35 U.S.C. 154(b) by 200 days.

(21) Appl. No.: 16/090,844

(22) PCT Filed: Apr. 10, 2017

(86) PCT No.: PCT/EP2017/058526
§ 371 (c)(1),
(2) Date: Oct. 3, 2018

(87) PCT Pub. No.: WO2017/174819
PCT Pub. Date: Oct. 12, 2017

(65) Prior Publication Data
US 2019/0107628 A1 Apr. 11, 2019

(30) Foreign Application Priority Data
Apr. 8, 2016 (EP) .................................... 16305407

(51) Int. Cl.
*G01S 19/11* (2010.01)
*G01S 1/02* (2010.01)
(Continued)

(52) U.S. Cl.
CPC ................. *G01S 19/11* (2013.01); *G01S 1/02* (2013.01); *G01C 21/206* (2013.01);
(Continued)

(58) Field of Classification Search
CPC . G01S 19/11; G01S 19/00; G01S 1/02; G01S 1/7034; G01S 1/70; G01S 2201/00;
(Continued)

(56) References Cited

U.S. PATENT DOCUMENTS 7,970,537 B2 * 6/2011 Ann .................... H04B 10/1141
701/434
8,510,033 B2 * 8/2013 Park ..................... G01C 21/206
701/409
(Continued)

FOREIGN PATENT DOCUMENTS

| EP | 2410348 A2 | 1/2012 |
| EP | 2944973 A2 | 11/2015 |
| JP | 2005077172 A | 3/2005 |

OTHER PUBLICATIONS

International Search Report/Written Opinion for PCT/EP2017/058526 dated Jun. 28, 2017.

*Primary Examiner* — Chuong P Nguyen
(74) *Attorney, Agent, or Firm* — Burris Law, PLLC

(57) ABSTRACT

A navigation system using Visible Light Communications (VLC), the associated transmitters and receivers, the navigation system comprising a plurality of VLC transmitters (201 to 207) and one or more GNSS receiver (430), each of the VLC transmitters being configured to transmit a positioning signal comprising a navigation message including time information, where the time information is a transmission time of a specific part of said navigation message derived from a GNSS reference time. The receivers (221) according to the invention are configured to calculate a position from either VLC pseudo ranges, GNSS pseudo ranges, or a combination thereof.
The associated methods for transmitting positioning signals in a navigation system according to the invention, and for (Continued)

determining a position from a plurality of positioning signals transmitted by said navigation system.

14 Claims, 9 Drawing Sheets

(51) Int. Cl.
*G01S 5/16* (2006.01)
*G01S 1/70* (2006.01)
*G01C 21/20* (2006.01)

(52) U.S. Cl.
CPC ............... *G01S 1/7034* (2019.08); *G01S 5/16* (2013.01); *G01S 2201/01* (2019.08)

(58) Field of Classification Search
CPC .... G01S 2201/01; G01S 2201/02; G01S 5/16; G01C 21/206
USPC .................................. 342/357.48, 357.2, 385
See application file for complete search history.

(56) References Cited

U.S. PATENT DOCUMENTS

| | | | |
|---|---|---|---|
| 8,805,645 B2* | 8/2014 | Giesekus | G01S 1/70 702/152 |
| 8,994,814 B2 | 3/2015 | Ganick et al. | |
| 9,184,837 B2* | 11/2015 | Yoo | H04B 10/116 |
| 9,228,840 B2* | 1/2016 | Bae | G01C 21/00 |
| 9,551,776 B2* | 1/2017 | Jones | G01S 5/16 |
| 9,609,726 B2* | 3/2017 | Kim | B60R 25/33 |
| 9,660,727 B2* | 5/2017 | Jovicic | H04B 10/116 |
| 9,791,544 B2* | 10/2017 | Jovicic | H04W 64/006 |
| 9,948,394 B1* | 4/2018 | Bitra | H04B 10/1149 |
| 10,187,163 B2* | 1/2019 | Breuer | H04B 10/1149 |
| 10,505,627 B2* | 12/2019 | Noh | H04W 76/15 |
| 2002/0111213 A1* | 8/2002 | McEntee | G07F 17/32 463/42 |
| 2009/0171571 A1 | 7/2009 | Son et al. | |
| 2011/0153201 A1 | 6/2011 | Park et al. | |
| 2012/0022826 A1* | 1/2012 | Giesekus | G01S 1/70 702/150 |
| 2013/0028475 A1* | 1/2013 | Ganick | H04W 4/029 382/103 |
| 2013/0211715 A1 | 8/2013 | Bae et al. | |
| 2013/0324154 A1* | 12/2013 | Raghupathy | G01S 5/0236 455/456.1 |
| 2014/0313520 A1 | 10/2014 | Naethke et al. | |
| 2015/0230322 A1* | 8/2015 | Kim | B60R 25/33 315/154 |
| 2015/0323647 A1* | 11/2015 | Jones | G01S 1/70 356/614 |
| 2016/0109582 A1* | 4/2016 | Sendonaris | G01S 5/0236 455/456.1 |
| 2018/0088208 A1* | 3/2018 | Gagrani | H04W 52/0254 |
| 2018/0216941 A1* | 8/2018 | Zhu | G01S 5/16 |

* cited by examiner $$P_N^1 = \sqrt{(X_1 - U_x)^2 + (Y_1 - U_y)^2 + (Z_1 - U_z)^2} + c(dT_n)$$

$$P_N^2 = \sqrt{(X_2 - U_x)^2 + (Y_2 - U_y)^2 + (Z_2 - U_z)^2} + c(dT_n)$$

$$P_N^3 = \sqrt{(X_3 - U_x)^2 + (Y_3 - U_y)^2 + (Z_3 - U_z)^2} + c(dT_n)$$

$$P_N^4 = \sqrt{(X_4 - U_x)^2 + (Y_4 - U_y)^2 + (Z_4 - U_z)^2} + c(dT_n)$$

VISIBLE LIGHT COMMUNICATION BASED POSITIONING

FIELD OF THE INVENTION

The present invention applies to the field of positioning systems. More specifically, the invention describes a positioning system based on Visible Light Communications (VLC).

BACKGROUND PRIOR ART

Positioning techniques, and in particular indoor positioning techniques are subject to an increasing interest, due to the large variety of applications that are concerned. Among these applications are the Location Based Services (LBS), in public places such as malls, stadiums or parking lots, where an indoor positioning system allows providing content that really matches the user's needs. Among these applications are also the machine-control, as for example the control of robots in a warehouse, the path finding applications, the augmented reality and many others. In order to be relevant, the indoor localization must be very accurate.

GNSS (acronym for Global Navigation Satellite Systems) positioning techniques have been used and improved for many years. Two Global Navigation Satellite Systems (GNSS) have been fully deployed for a number of years (the US Global Positioning System (GPS) and the Russian GLONASS) and two more are under deployment (the Chinese Beidou Navigation Satellite System and the European Galileo system). GNSS positioning techniques provide a precise and reliable positioning (in some configurations, better than 1 m), but preferably need to operate in environments where the receiver is in line of sight with many satellites. When the propagation conditions comprise reflections over the environment, as for example in an urban environment, the quality of the GPS localization is deteriorated to an order of tens of meters.

Moreover, due to their carrier wavelength, GPS positioning signals significantly lose power when passing through construction materials, such as roof or walls For these reasons, relying on GPS signals for localization in indoor environment, where there is no visibility between the receiver and the satellites and where the propagation environment is rich in reflections, is impossible.

Ad-hoc indoor solutions have been developed in the last few years, in order to provide indoor localization. These techniques mostly rely on the use of signals of opportunity (Wi-Fi, Bluetooth™, cell tower ID, digital TV) combined or not with signal strength information, but provide poor accuracy. Other techniques rely on the use of inertial sensors, which are well-suited for indoor services, but which require an accurate calibration, and give time-dependent results. Specific techniques providing accurate results in a multipath environment, such as Ultra Wide Band, have also been developed. They show the drawback of consuming radio frequency (RF) spectrum, and thus are subject to restrictive regulatory measures and show important constraints on the design of the receiver radio frequency chain.

Visible Light Communications (VLC) is a wireless transmission technology that uses light as a transmission medium, instead of radio frequencies. VLC communications are secure, as they are limited to free-space transmission and do not cross natural barriers such as walls. They can also be used freely without any restriction, unlike radio frequencies bands where the spectrum is crowded and over regulated, and do not interfere with other electronic equipment. VLC technology is cheap to implement, the signal to transmit being directly used as an input for modulating an optical signal delivered by a standard lamp, such as a fluorescent lamp, an incandescent lamp, of a Light Emitting Diode (LED) at a speed that is imperceptible to the human eye. VLC transmissions are often dubbed Li-Fi (acronym for Light-Fidelity) when used as a wireless transmission support instead of Wi-Fi.

Indoor positioning techniques based on Visible Light Communications have been proposed, as for example in US Patent Application US 2014/0313520 A1 or US 2011/0153201 A1, but these techniques are limited to transmitting, from light sources positioned at various places in an indoor environment, a unique identifier that is correlated by the receiver with a map indicating the position of the corresponding lights. The accuracy of such a positioning technique is somehow limited.

U.S. Pat. No. 8,994,814 B2 proposes to improve these techniques by receiving such identifiers from multiple sources, and calculating the positioning of the receiving device using photogrammetry. Photogrammetry is a technique used to determine the geometric properties of objects found in photographic images. In the context of the patent, it refers to analyzing the relative positions of the light sources to determine the position of the receiving device. If this method improves the positioning of the device, its accuracy is still limited and its complexity is high. In particular, it requires storing in memory a database comprising the relative position of all the sources in each point of the building.

There are also other known methods, as described in US Patent Application US 2013/0211715 A1, where Visible Light Communications are used together with GPS positioning techniques. The method consists in determining a position using a GPS signal and, when an error measurement of this position exceeds a threshold, calculating a hybrid position from this GPS position and a second position transmitted by a visible light communication device. This method is not adapted for full indoor positioning service, as the GPS signal can be totally missing.

Finally, there are also known positioning methods using Visible Light Communications and triangulation techniques performed from a distance calculation to at least three VLC transmitters, the distance calculation being estimated based on the received power level. The quality of the positioning is particularly sensitive to the quality of the power level estimate, and requires using a plurality of photo-detectors or a complex multiplexing method.

SUMMARY OF THE INVENTION

It is an object of the invention to provide improvements over the prior art by providing a method and apparatus for transmitting a GNSS-like signal using Visible Light Communications, and a method and apparatus for receiving such a signal from a plurality of transmitters and calculating a position accordingly. The positioning technique according to the invention shows a high accuracy, as inspired from known GNSS techniques. It is economical to implement as it does not require specific hardware, and can be deployed anywhere as Visible Light communications do not interfere with electronic devices and do not have to fit into constraining spectrum regulation. The navigation system as described here is particularly suited to indoor environments, but can be deployed either in indoor or outdoor environment. In addition, in some embodiments of the invention, transition from a VLC positioning system according to the invention to a GNSS positioning system can be achieved in a seamless and continuous way.

To this effect, the invention discloses a navigation system using Visible Light Communications. The navigation system comprises one or more GNSS receivers configured to compute a GNSS reference time from GNSS positioning signals, and one or more VLC transmitters configured to transmit a VLC positioning signal comprising a navigation message including time information (332), where the time information is a transmission time of a specific part of said navigation message derived from said GNSS reference time.

Advantageously, in the navigation system according to the invention, the navigation message is modulated by a pseudo random sequence said pseudo-random sequence being different for each VLC transmitter within a same area.

In one embodiment, the navigation system according to the invention further comprises a central equipment linked to the VLC transmitters and to the one or more GNSS receivers, said central equipment being configured to calculate and send the positioning signals to the plurality of VLC transmitters.

In another embodiment, the navigation system according to the invention further comprises a central equipment linked to the VLC transmitters and the one or more GNSS receivers, said central equipment being configured to calculate and send said time information to the VLC transmitters.

In another embodiment of the navigation system according to the invention, each of the VLC transmitters is connected to a GNSS receiver.

Advantageously, when the navigation system according to the invention comprises a navigation messages including the time information, the bit rate of the navigation message being higher than 500 bits/sec.

Advantageously, in the navigation system according to the invention, the VLC transmitters are configured to calculate said positioning signals.

Advantageously, in the navigation system according to the invention, the positioning signals further comprise information about said time information accuracy.

Advantageously, in the navigation system according to the invention, the positioning signals further comprise information about a position of the VLC transmitters.

Advantageously, in the navigation system according to the invention, the GNSS receivers are further configured to retrieve a GNSS navigation message from said GNSS positioning signals, the navigation message of the VLC positioning signals further comprising data comprised in a GNSS navigation message.

Another aspect of the invention provides a receiver configured to receive VLC positioning signals from VLC transmitters and GNSS positioning signals from GNSS transmitters, each positioning signal comprising time information, the receiver being configured to calculate VLC pseudo ranges from the VLC positioning signals and GNSS pseudo ranges from the GNSS positioning signals using said time information, and to determine a position from one or more of said VLC pseudo ranges and GNSS pseudo ranges, that is to say, from the VLC pseudo ranges, the GNSS pseudo ranges or a combination thereof.

Advantageously, the receiver further comprises a plurality of tracking loops, each of the tracking loops being configured to calculate a reception time from a correlation between one of said received positioning signal and a local replica of said positioning signal. The receiver is configured to calculate a pseudo range from the calculated reception time and said time information.

Another aspect of the invention provides a method for transmitting positioning signals in a navigation system comprising a plurality of VLC transmitters. The method comprises:
  determining a time information relative to a transmission time of a specific part of a navigation signal to be transmitted within a positioning signal derived from a reference time acquired from said one or more GNSS receivers,
  calculating a plurality of positioning signals comprising said time information, and
  transmitting said positioning signals using said VLC transmitters.

Advantageously, the step of calculating a positioning signals comprises:
  calculating a navigation message including said time information, and
  modulating said navigation message with a pseudo-random sequence, said pseudo-random sequence being different for each VLC transmitter within a same area.

Finally, it is another aspect of the invention to provide a method for determining a position from one or more positioning signals transmitted by VLC transmitters comprising time information and one or more positioning signals transmitted by GNSS transmitters comprising time information. The method comprises:
  receiving said positioning signals from one or more of said VLC and GNSS transmitters,
  calculating, for each of said received signals, a pseudo range from said time information with the corresponding VLC and GNSS transmitters, and
  determining a position from said calculated pseudo ranges.

BRIEF DESCRIPTION OF THE DRAWINGS

The invention will be better understood and its various features and advantages will emerge from the following description of a number of exemplary embodiments and its appended figures in which.

The examples disclosed in this specification are only illustrative of some embodiments of the invention. They do not in any manner limit the scope of said invention which is defined by the appended claims.

DETAILED DESCRIPTION OF THE INVENTION

Figure 1:
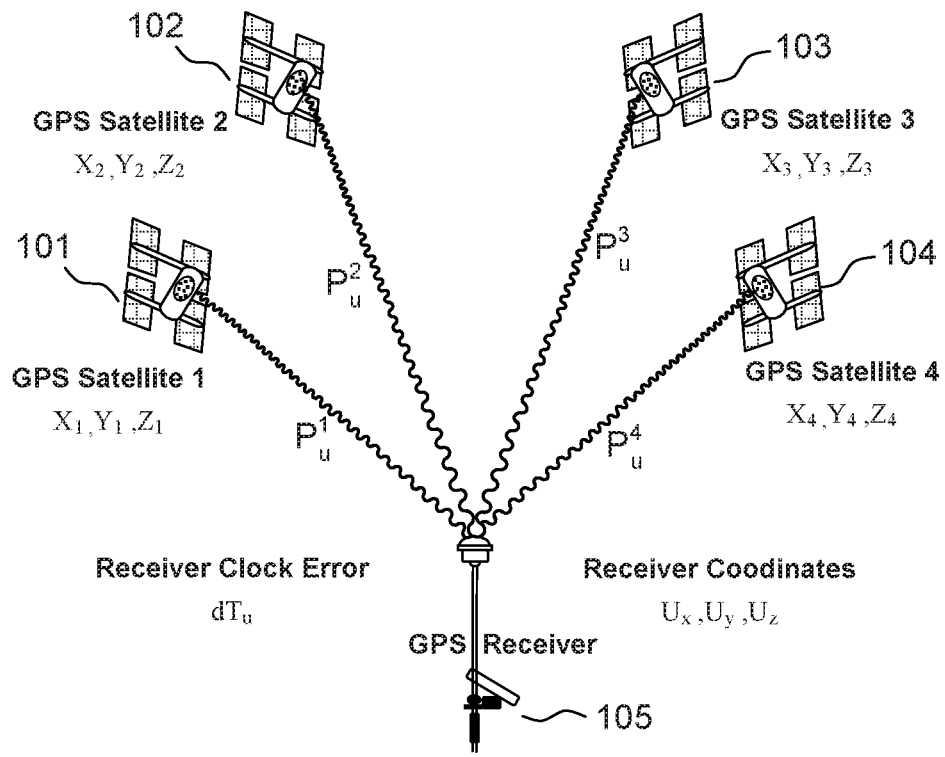
FIG. 1 describes a GNSS communication system according to the prior art.

FIG. 1 describes a GNSS communication system according to the prior art. The GNSS system can be either GPS, GLONASS, Beidou, Galileo, or may use signals from satellites of one of these constellations.

In FIG. 1, a plurality of satellites 101, 102, 103 and 104 are transmitting a GNSS positioning signal comprising information about the transmission time, this transmission time being delivered by a high accuracy clock embedded in each of the satellites.

GNSS receiver 105 comprises a plurality of tracking loops. Each tracking loop correlates the GNSS signal received from one of the satellites with a local replica of the signal, allowing it to determine the time of reception of the signal. The time of transmission of the signal is retrieved from the navigation message. The time difference between time of transmission and time of reception is then formed. This time difference, called pseudo range, is relative to the propagation time between the satellite and the receiver. It is biased by many phenomena, like the Tx and Rx clock drifts, the Doppler effect due to the relative movement of the satellite and the receiver, variable propagation delays for crossing the ionosphere and troposphere, etc. . . . .

The positioning signals also comprise information about the satellites' positions. These information are called ephemeris, the ephemeris delivering precise information about the position of the satellites, and almanacs, the almanacs containing coarse information that allow constructing the future positions of the satellites.

Knowing at least four pseudo ranges and their associated satellite position, it is well known how to build a precise estimate of a position, velocity and time (PVT).

The receiver architecture required for the calculation of the PVT has benefited of many years of research and development to reach a significant level of maturity. Nowadays, GNSS receivers can be found in many electronic devices, like cars, smartphones, drones, IoT (acronymous for Internet of Things) devices, wearable electronic devices . . . . The technological bricks, whether software or hardware, intended to deal with known interference issues, like, to a certain extent, impairments mitigation (interference, multipath reflections . . . ), or to improve the speed and accuracy of the positioning (sensor fusion algorithms, snapshot positioning . . . ), are well known and efficient.

Moreover, the GNSS receivers show good properties: real-time and high rate performances, accurate estimation of the position, velocity and time. As the transmission of the GNSS signals is a one-way transmission, the number of simultaneous receivers is unlimited.

The drawbacks of the GNSS positioning lies among others in its robustness to multipath interferences, and in the radio-wave propagation in indoor environments.

The accuracy of the GNSS positioning lies on the accuracy of the signals transmission time. Indeed, all GNSS satellites must be synchronised over a same clock so that a receiver can use the various signals to retrieve a position and time. To this end, GNSS satellites use atomic clocks.

Figure 2:
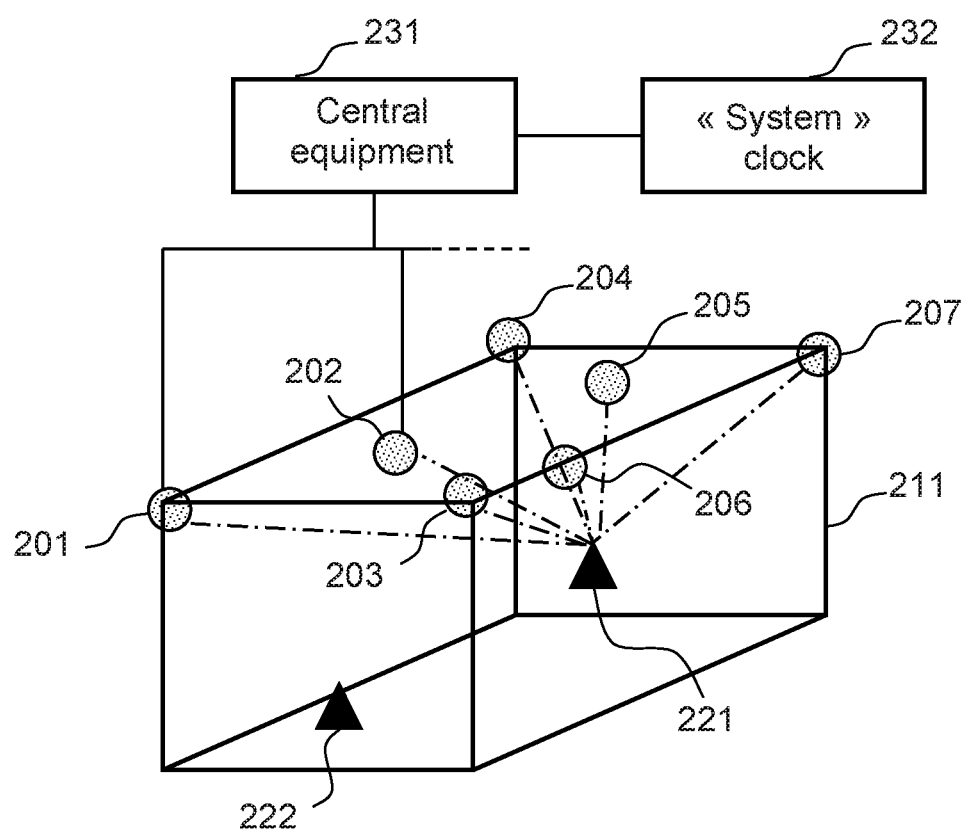
FIG. 2 describes a first embodiment of the invention, wherein the VLC communication system is self-contained.

FIG. 2 describes a first embodiment of the present invention. In this embodiment, a plurality of light bulbs 201 to 207, used as VLC transmitters, are disposed in a room 211, and configured to broadcast a positioning message.

The room 211 may be a warehouse, a shop, a shopping mall, a car park, a tunnel, or any other indoor environment, in which at least one VLC receiver 221 is looking for positioning information. The invention can also be implemented outside of a building, but its performance might suffer from the light pollution in broad daylight.

The VLC transmitters are standard light bulbs, which are used for both transmitting a positioning signal, and lighting the room. LED (Light Emitting Diodes) transmitters are particularly adapted as they produce a high brightness and illumination with a low energy consumption compared to incandescent or fluorescent lamps. They also have a long life expectancy and a low cost. In addition, their intensity can be varied, and they can be switched ON and OFF at high frequencies, which allows them to perform data modulation and be a vector for wireless communications.

There is no actual physical restriction, nor regulatory restrictions, concerning the emitted light of the VLC transmitters used to implement the invention: it could be visible light, or invisible light, like infrared or ultraviolet. Blue LEDs are the most widely used, since they are the cheapest and most energy-efficient LEDs, and are then just coated with phosphorous to produce white light. Lasers may also be used, as an alternative option. The VLC transmitters may all use a same optical frequency, or use different optical frequencies if the VLC receivers are designed to receive all these frequencies.

The disposal of the VLC transmitters must be sufficiently dense so that a receiver at any place of the room is able to receive light emitted from a plurality of VLC light bulbs, typically four.

The VLC receivers 221 are devices including a photodiode sensor for receiving the VLC signals, and linked to a computing logic, for calculating a position from said signals. The receiver can either be a smartphone, a dedicated device, a car, a drone, an IoT device, a wearable electronic device or any other mobile device. The photodiode can also be a remote device, as for example a sensor positioned on the body of a car, on a watch, on a clothe or on glasses, and linked to the computing logic through a communication link like a cable, Wi-Fi, or Bluetooth™.

The photo-detectors of the VLC receivers are designed to operate at the same frequencies as the VLC transmitters.

All the VLC transmitters are linked to a central equipment 231 in charge of synchronizing the positioning signal transmissions. The link can be achieved via a wired connection (as for instance an Ethernet link on a coaxial cable, a twisted-pair cable, an optical fiber or power-line communication (PLC)), or a wireless connection, provided that the propagation delays of the wireless connection are managed (using for instance methods like Reference Broadcast Time synchronisation (RBS)). The central equipment can be a server, a computer, or any programmable device (digital signal processor, field programmable gate array, ASIC . . . ) comprising a clock 232. It is not required that the clock reaches a high level of performance in terms of stability, as in this embodiment, the system has only one clock. Indeed, if the clock shifts, all the receivers will follow the clock shift, without any consequences on the accuracy of the positioning.

In this embodiment of the invention, the central equipment generates a positioning signal comprising a message including time information, directly obtained or derived from the clock's time, and transmits this signal to each of the VLC transmitters 201 to 207. The positioning signals are transmitted in the form of a binary sequence. A driver circuit in each of the light bulbs then switches the received signal into an ON/OFF state. A known and usual way to modulate the binary sequence is indeed to use an On-Off Keying (OOK) modulation, but any other modulation allowing transmitting a binary sequence using VLC could be used. Thus, the information bits of the positioning signal modulate the light signal emitted by the VLC transmitters.

In this implementation, the light bulbs do not require any computing logic, as their only function is to blink accordingly to a received positioning signal. The light bulbs can be replaced without taking any specific precaution, heterogeneous models of light bulbs being interoperable in a same area if they transmit on a same optical frequency.

A VLC receiver 221, trying to determine its position, receives the light signals on its photodiode and discriminates, within said light signals, the signals originating from the various VLC transmitters. Methods for discriminating the signals will be described in more detail further down in this specification.

As in classical GNSS receivers, the VLC receiver decodes the positioning messages, and measures pseudo-ranges that are related to the propagation time between the VLC receiver and each of the VLC transmitters. From this information, a position, velocity and time can be recovered similarly to that which is done for GNSS navigation systems.

The accuracy of the positioning method depends on the accuracy of the transmission time of the positioning signals. In order to offer the best possible accuracy, the positioning signals transmitted by the VLC transmitters must be synchronised over a same reference clock. Thus, the VLC positioning signals refer to a unique time reference, and the receiver can calculate its position by trilateration or multi-lateration. This can be achieved either by driving clocks of each VLC transmitter over the clock of the central equipment, or by adjusting the transmission of information from the central equipment to the VLC transmitters in accordance to their distance. Synchronizing the VLC transmitters does not necessarily mean that they all transmit identical time information at the exact same time. It means that the time information that is propagated through each VLC positioning signals is derived from a same and unique reference clock, to make them consistent. This is a mandatory prerequisite to perform a positioning based on trilateration or multilateration.

Advantageously, when the central equipment and the VLC transmitters are linked by cables (Ethernet cable, optical fiber, power-line communication . . . ), the length of the cables may be equivalent, or at least their transmission delay should be calibrated.

Alternatively, the propagation times between the central equipment and each of the VLC transmitters can be estimated, considering for example the actual length of the cables. In another embodiment, one or more reference VLC receivers 222 can be located at known positions in the room 211 in order to evaluate errors on the apparent clock bias of the different positioning signals during a preliminary phase of calibration of the local network. The reference receiver estimates its own clock bias, and knows precisely its distance to each VLC transmitter, so that any mismatch between theoretical and measured pseudo ranges is the apparent clock bias for this VLC transmitter.

The central equipment then broadcasts this delay, so that the receivers know the correction that must be applied to the received clock data.

In another implementation, a mechanism of «clock steering» can be performed at the level of the central equipment to ensure that the apparent clock bias for each light bulb is as close to zero and constant as possible.

To that end, the central equipment adjusts the transmission of the positioning signals to the VLC transmitters, taking into account the estimated propagation time, so that the transmissions by the light bulbs occur at the exact expected transmission time.

In another implementation of the invention, each of the VLC transmitters comprises a computing logic that can be configured to generate the emitted positioning signal, based on time information delivered simultaneously to all the light bulbs by the central equipment. In this embodiment, the computing logic for processing the positioning signal are required at the level of each VLC transmitter, which might be more expensive to operate. This computing logic can be any kind of calculation circuit(s) (processor, field-programmable gate array . . . ) associated or not with a memory.

To ensure synchronisation between the transmitted signals, the propagation time between the VLC transmitters and the central equipment can be estimated and compensated as indicated above. Alternately, each VLC transmitter comprises a clock, said clocks being synchronized with each other, to share a common time reference using for instance a synchronisation mechanism like the NTP protocol (acronym for Network Time Protocol). The synchronisation mechanism may be a mechanism distributed between the VLC transmitters, a mechanism considering a master reference clock, or a mechanism derived from a master reference clock.

Figure 3A:
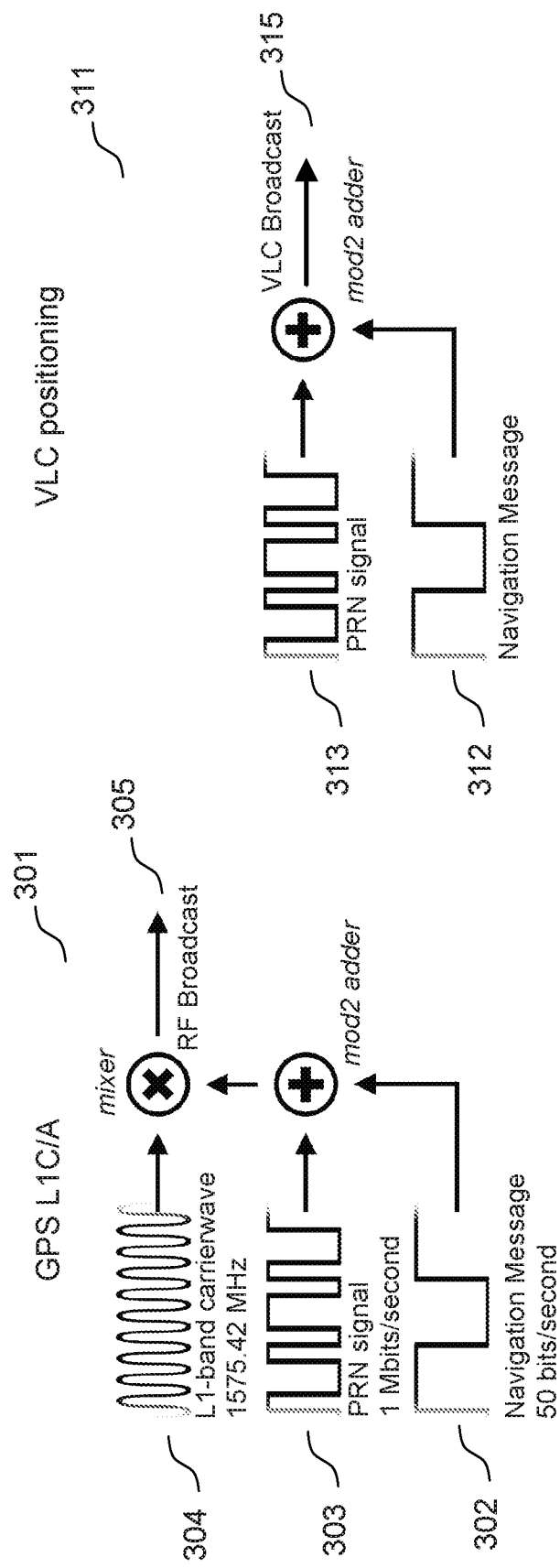
FIG. 3a compares a GNSS positioning signal (known from the prior art) and a VLC positioning signal according to the invention.

FIG. 3a compares a GNSS positioning signal (known from the prior art) and a VLC positioning signal according to the invention.

The left part of FIG. 3a is a rough scheme of a GPS signal called GPS L1C/A 301, which is also known as the legacy civilian signal broadcast by the GPS satellites.

This signal is made of a navigation message 302, that comprises among others an information about the time at which the message is transmitted. The bit rate of the navigation message is 50 bits/sec. This message is modulated by a pseudo random sequence 303 at 1.023 Mbits/sec. The signal is furthermore modulated by a subcarrier 304 at 1575.42 MHz. That signal is transmitted by the satellite in the radio frequency spectrum 305.

The VLC positioning signal 311 according to the invention, on the right part of FIG. 3a, is made of a navigation message 312 modulated by a pseudo random sequence 313. The resulting signal is directly transmitted via the VLC transmitter in the optical spectrum 315.

Concerning the transmitted VLC positioning message, the navigation message 312 bit rate, as well as the pseudo random sequence 313 bit rate and length, can be chosen equal to those of the GPS L1C/A message, so that the architecture of the VLC receiver is exactly the same as the architecture of a standard GPS receiver (except for what concerns the stage of transposition to RF frequency). However, other specific values can be considered for implementation.

It is known that the tracking jitter is lower when the chip rate increases. The Li-fi II protocol shows sampling rates that are higher than 250 Mbits/sec. In order to fulfil the Shannon theorem, and to maintain a link with a GPS receiver, the chip rate of the pseudo random sequence can be chosen at Rc=102.3 Mbits/sec, which is 100 times the GPS chip rate. Likewise, in order to show a ratio 'navigation message bit rate' over 'pseudo random sequence chip rate' equivalent to the one of the GPS L1C/A signal, the navigation message bit rate could be of about 5000 bits/sec. These values are possible values, given for example purposes only, many other functional arrangements being possibly determined by a person having average skills in the art.

A message bit rate of 5000 bits/sec instead of 50 bits/sec (125 bits/sec for Galileo and 500 bits/sec for the Galileo E6 Commercial Service) may, in one embodiment, reduce the time the receiver takes to synchronize, thus increasing the quality of service.

In GPS L1C/A, the pseudo random sequence used to modulate the message signal is a Gold code with a length of 1023 chips. In Galileo, the signal E1BC is 4092 chips long. Although these pseudo random code lengths could be used, a longer sequence leading to an increased robustness of the position calculation, a shortest sequence leading to a reduced time to first fix of the receiver. The size of the pseudo range code length results of a compromise between overall performance, synchronisation time, and search space complexity. A good compromise would be achieved using a 2048 chips long pseudo random sequence for instance.

In the current example, the pseudo random sequence is generated considering a Gold code, in order to use the same receiving algorithms as in the GPS receivers, but any other pseudo random sequence generated by a code having good intercorrelation performances would suit.

The VLC transmitters of a same area use different pseudo random sequences. This CDMA technique (acronym for Code Division Multiple Access) makes the receiver capable of separating the different sources. In one embodiment of the invention, the central equipment associates each VLC transmitter with a specific identifier that is used to generate the pseudo random code. When the central equipment is in charge of generating the positioning signal, it modulates a unique navigation message with a plurality of pseudo random codes before sending the messages to the VLC transmitters. When the VLC transmitters are in charge of generating the positioning signal, the central equipment communicates to each VLC transmitters its identifier.

Alternatively, the positioning signal may be transmitted using different transmission frequencies (which, in the case of VLC transmissions, are light colours), in a FDMA (acronym for Frequency Division Multiple Access) fashion. All the VLC positioning signals can therefore be modulated using a same pseudo random sequence, discrimination between the different transmitters being performed on the receiver side considering the transmission frequency (light colour).

As in GPS, the use of specific pseudo ranges sequences, or encrypted sequences can be a simple and effective approach to improve the transmissions security, and to increase the protection against spoofing. Such sequences can also be used to restrict the access to a limited set of users.

Figure 3B:
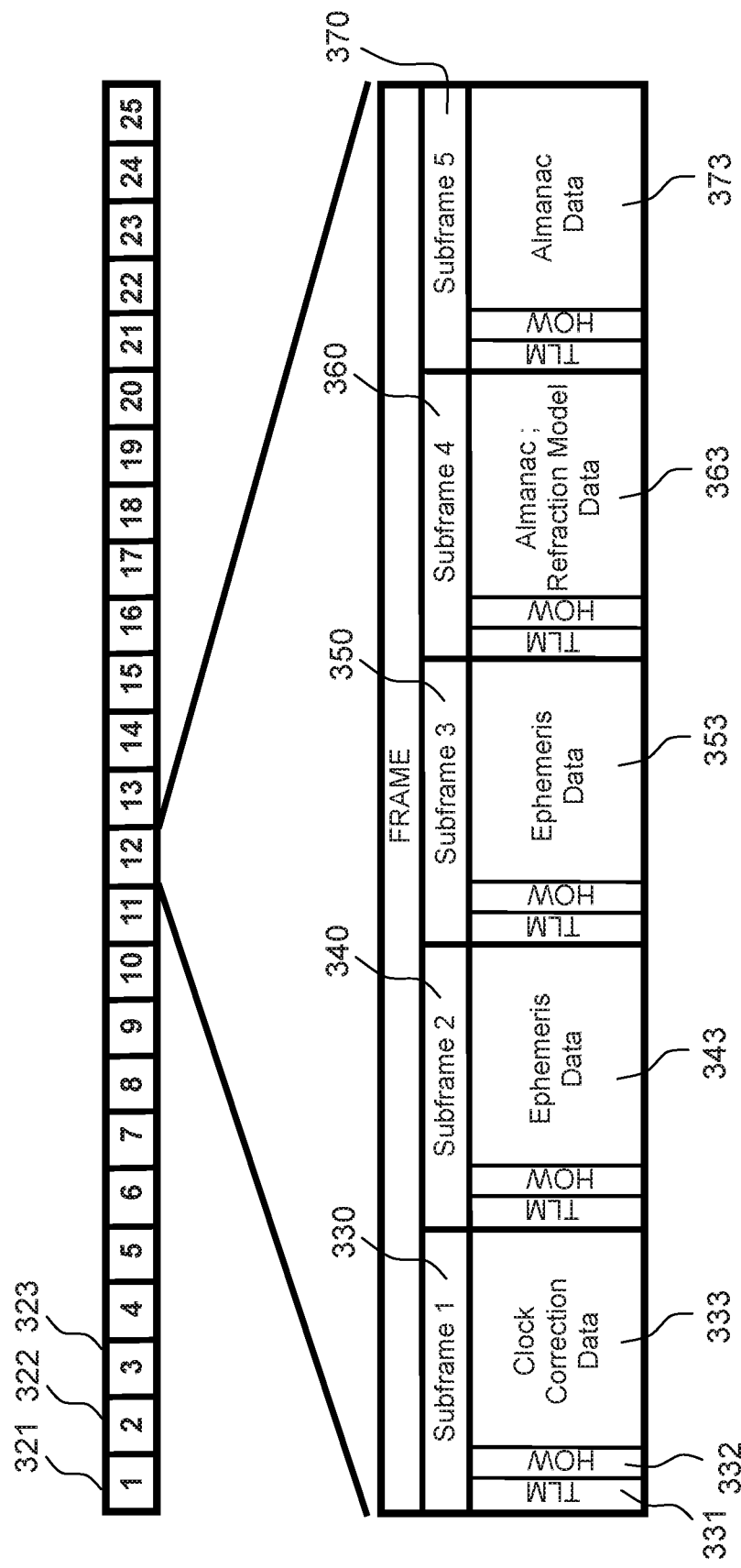
FIG. 3b describes a positioning message transmitted in a VLC navigation system according to the invention.

FIG. 3b describes a positioning message transmitted in a VLC navigation system according to the invention.

The structure of the navigation message of this example is somehow close to the structure of the legacy GPS message, maximizing the common features with this technology and thus minimizing the cost for developing new equipment, but the design of specific navigation messages would be possible as well.

The navigation message is transmitted in frames 321, 322, 323, each frame being subdivided in subframes 330, 340, 350, 360 and 370.

The first subframe 330 comprises a field TLM 331 (TLM being the acronym for telemetry), containing a known sequence used to synchronize the receiver on the navigation message.

The first subframe 330 furthermore comprises a field HOW 332 (HOW being the acronym for HandOver Word), containing a precise time information. In a GPS navigation message, the time information contained in the HOW field is the time at which the first bit of the next subframe will be transmitted. This information is the key information that is required by the receiver, along with a precise reception time of the positioning signal, to compute pseudo range measurements from which a position is determined. Depending on implementation choices, it can be the time at which the clock's time was acquired, the time the message was transmitted, or the time any relevant part of the navigation message is transmitted, as in the case of the GPS system.

The first subframe 330 furthermore comprises a clock correction data field 333, containing information about the accuracy of the time information contained in the message. In the GPS navigation message, this information is filled with information on the satellite clock bias and drift. In the invention, the different VLC transmitters being linked to a same clock, this information can be filled with an estimate of the propagation time between the central equipment and the VLC transmitter, as described previously.

The subsequent subframes 340, 350, 360 and 370 also comprise the TLM and HOW fields.

In addition, the subframes 340 and 350 both comprise an ephemeris data field 343 and 353. In a GPS navigation message, these fields contain information about the position of the satellites. The ephemeris are transmitted part by part, it takes about 20 seconds to retrieve the totality of the ephemeris under best case conditions with current equipment. In the navigation message according to the invention, these fields might contain information about the absolute position of the VLC transmitters. Alternatively, the VLC transmitter locations can be stored within the receiver device (for example in a map stored in memory), so that ephemeris data do not have to be transmitted, and can be suppressed or replaced by other data.

The positions of the VLC transmitters can be recorded using a global coordinate system, like the ECEF coordinates (acronym for Earth-Centered, Earth-Fixed), or using local coordinates, i.e. referred to a reference point in the building. In that case, if the ECEF coordinates of this reference point are known from the receiver, both local and ECEF coordinates are immediately available at the receiver.

Finally, the subframes 360 and 370 both comprise an almanac data field 363 and 373, plus a refraction model for the subframe 360. In a GPS navigation message, these fields contain coarse orbit and status information for each satellite in the constellation, plus an ionospheric model and information to relate GPS derived time to coordinated universal time (UTC). The propagation of the positioning signal not being submitted to ionosphere delay, one advantage of the invention is that the ionospheric model is no longer required. Furthermore, as the position of the light bulbs is static, the almanacs can be replaced by any relevant information.

Thus, depending on implementation choices, the navigation message according to the invention may have a structure close to the structure of a standard GPS navigation message, wherein the ephemeris data can possibly be replaced by additional clock correction data, and wherein almanacs can be replaced by any relevant information. Otherwise, a specific navigation message can be designed, limited to the minimum information required, which are the synchronisation bits 331, time information 332 and clock correction data 333, plus ephemeris data informing on the position of the VLC transmitters if needed.

Considering that the bit rate of the navigation message according to this embodiment of the invention is higher than in current GNSS navigation messages, the time to retrieve all navigation data necessary to compute a first estimate of the position is advantageously reduced and could be under 0.1 seconds with a navigation message bit rate of 5000 bits/sec.

Figure 4A:
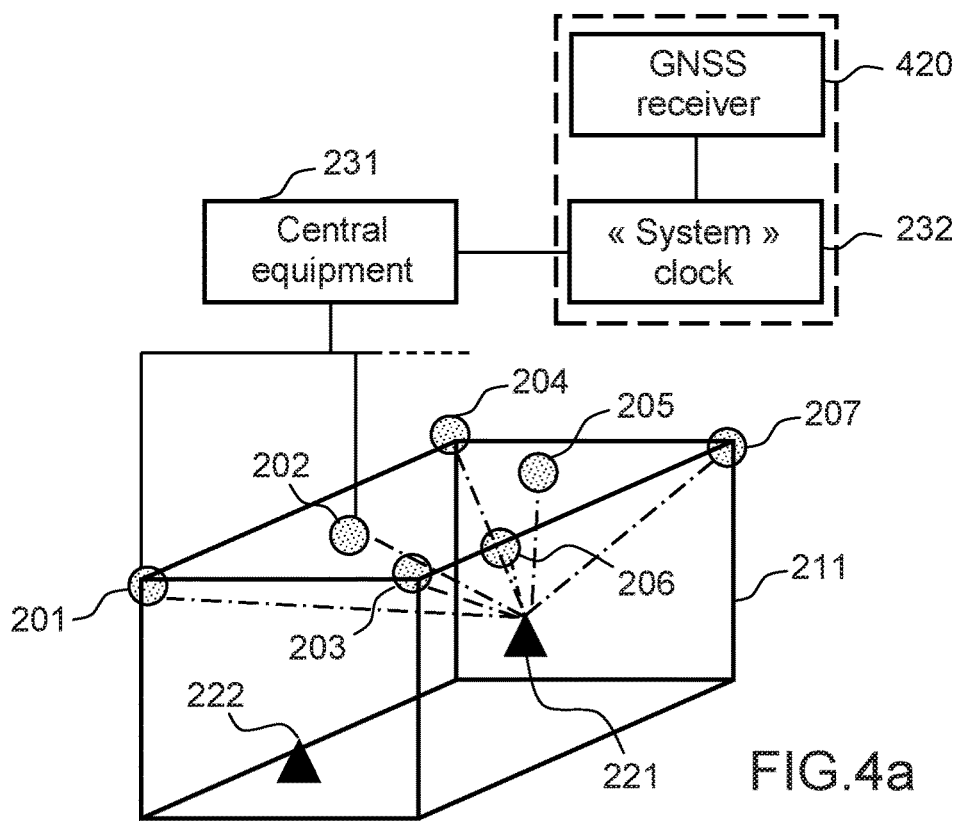
FIG. 4a describes a second embodiment of the invention, wherein the VLC positioning communication system has a clock driven by a GNSS receiver.

FIG. 4a describes a second embodiment of the invention, wherein the clock of the central equipment is piloted by a GNSS receiver 420, the GNSS receiver being in line of sight with GNSS transmitters (satellites, ground stations, pseudolites) or being connected to an antenna which is in line of sight with GNSS transmitters.

Contrary to the first embodiment of the invention, where the system is linked to a standalone clock whose bias with regard to a known time reference is unknown, in this embodiment, the system clock is driven using a GNSS receiver. The clock used as a time reference for the VLC navigation system is the GNSS clock. The time information transmitted through the positioning signals is calculated from this GNSS time reference, that is they are expressed in the GNSS time referential.

Thus, the clock bias of any receiver synchronized on the positioning signal according to the invention can be known with respect to a GNSS navigation system time, since the system clock is steered to the GNSS system time.

As a consequence, any receiver synchronized in the VLC positioning system according to the invention has the capacity to switch to the GNSS system in a limited time, as its position and the time information are already known, provided that the receiver has some coarse information about the GNSS satellites positions (as for instance given by almanacs acquired during a previous GNSS acquisition, the almanacs having a lifetime of many days). Indeed, as the receiver time and position are determined in a same referential in the VLC positioning system and in the GNSS positioning system, the tracking loops processing the GNSS signals can be preset close to the right position even before receiving GNSS signals. Therefore, the step of acquisition of the GNSS signals, in which the receiver tries to determine the phase of the received GNSS signals, can be reduced significantly. This applies equally for transitions from a GNSS positioning system to a VLC positioning system.

This embodiment guaranties fast indoor/outdoor transitions, which can even be improved by inserting VLC transmitters in the transition zone between the VLC positioning system and the GNSS positioning system. When a receiver according to the invention moves from inside a building, where positioning is performed using VLC transmitters only, to go outside, where positioning is performed using GNSS transmitters only, it progressively loses reception of the VLC positioning signals, and progressively acquires reception of the GNSS positioning signals (and conversely). So as to provide a seamless transition between indoor and outdoor, the receiver according to the invention comprises one or more reception chains to process VLC signals, in order to calculate VLC pseudo ranges, and one or more reception chains to process GNSS signals, in order to calculate GNSS pseudo ranges. The PVT calculation is performed using either GNSS pseudo ranges, VLC pseudo ranges or a combination thereof. Calculating directly and without adding constraints (such as additional data to be transmitted and/or additional unknowns to be estimated) a position from pseudo range retrieved from heterogeneous positioning systems is only possible due to the fact that the two networks share a common time reference. Both GNSS and VLC systems being synchronised over a common clock, the merge of data acquired from each system can further be extended to other raw data indicators, as for instance Doppler shift measurements. In the system according to this embodiment it is possible to cover the positioning of a receiver regardless to the propagation environment, using RF signals for outdoor positioning and optical signals for indoor positioning. Transitions between indoor and outdoor take place in a smooth and seamless way.

Figure 4B:
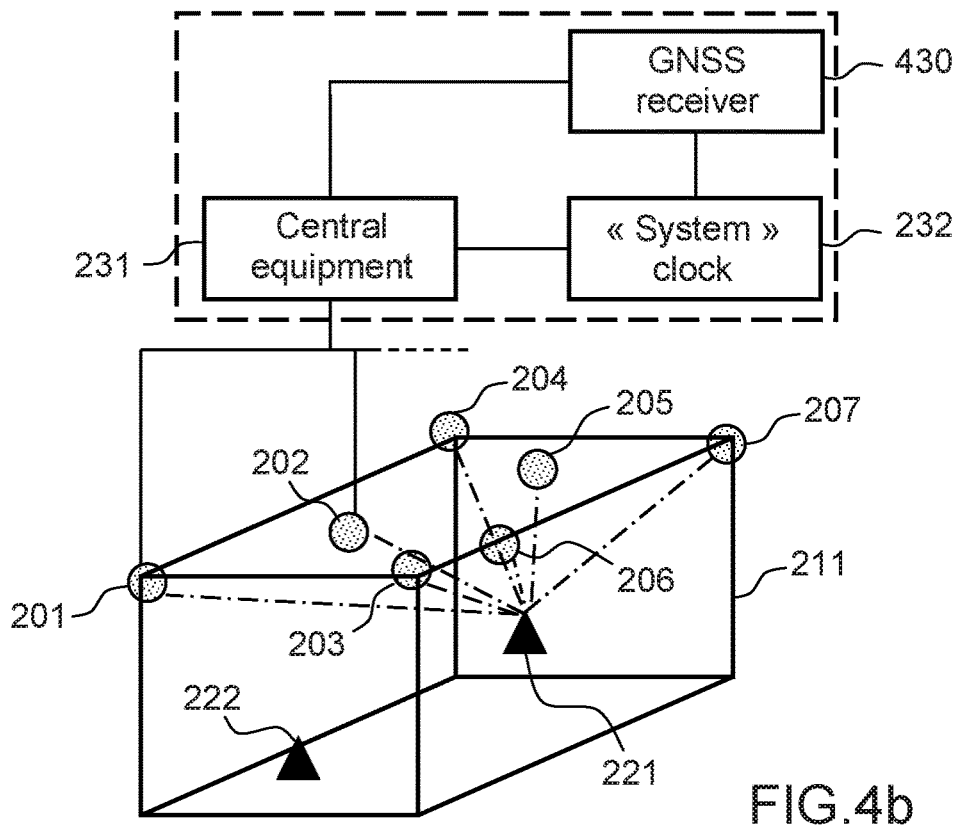
FIG. 4b describes a third embodiment of the invention, wherein the VLC positioning communication system is linked to a GNSS receiver.

FIG. 4b describes a third embodiment of the invention, wherein the VLC positioning communication system is linked to a GNSS receiver.

In this embodiment, both the clock and the central equipment are linked to a GNSS receiver 430. In addition to the driving of the system clock from the GNSS clock, as described in the second embodiment, the central equipment has the capability to retrieve the navigation messages data from the GNSS receiver.

In this embodiment, the navigation message of the VLC positioning signals comprises at least the ephemeris and almanacs provided by the GNSS system.

The central equipment can introduce this information in the positioning messages it generates. If the VLC transmitters are in charge of generating the positioning messages, the central equipment transmits this information along with the time information.

Any receiver synchronized in the VLC positioning system according to the invention has the capacity to switch almost instantaneously to the GNSS system, as its position and the time information are already known in references similar to the ones used by the GNSS system, as well as the position and clock information of the GNSS satellites.

This embodiment advantageously guaranties a seamless indoor/outdoor transition.

Figure 4C:
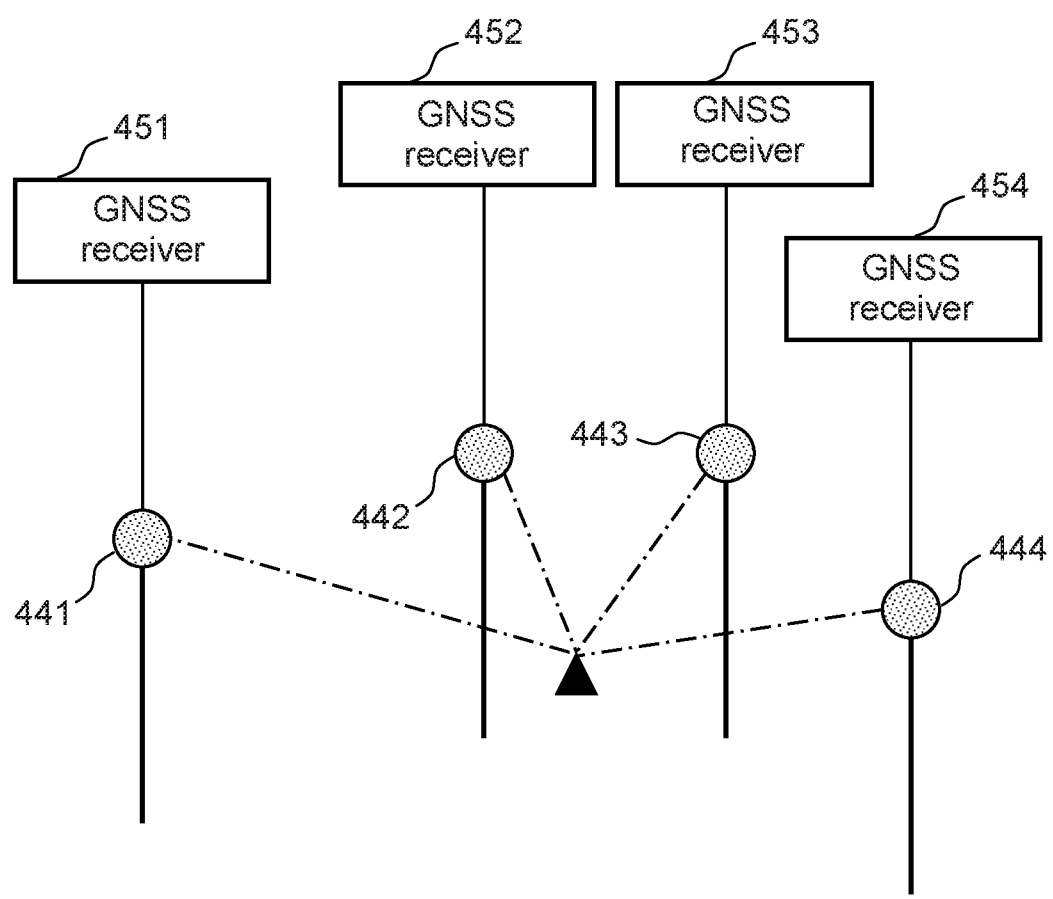
FIG. 4c describes a fourth embodiment of the invention, wherein the VLC positioning communication system comprises a plurality of stand-alone VLC transmitters.

FIG. 4c describes a fourth embodiment of the invention, wherein the VLC positioning communication system comprises a plurality of stand-alone VLC transmitters 441 to 444, each VLC transmitter being paired with a GNSS satellite receiver 451 to 454.

In this embodiment, the VLC transmitters may operate independently, but share a common time reference delivered by a GNSS receiver. In addition, the VLC transmitters can retrieve and broadcast the information gathered in the GNSS navigation message. This embodiment is particularly suited for outdoor operations, using for instance street lights to provide a positioning signal in urban canyons, where lack of clear sky and attenuated signals are an issue for a quick GNSS positioning. Use of VLC positioning signals, potentially comprising ephemeris and almanacs information retrieved from the GNSS system, can ensure a fast acquisition of the position of the receiver and satellites, before switching to the GNSS system.

A typical case of operation is a car going out of an indoor parking lot or a tunnel. Instead of waiting tens of seconds for the GNSS receiver to acquire the ephemeris and its position, deploying a VLC positioning system on the first few meters outside of the parking lot will help providing an almost instantaneous positioning and help acquisition of the GNSS system satellites. Advantageously, the navigation message bit rate can be increased, so as to speed up the transmission of the navigation message.

This embodiment requires that the VLC transmitters comprise a computing logic for calculating the positioning signal.

Figure 5A:
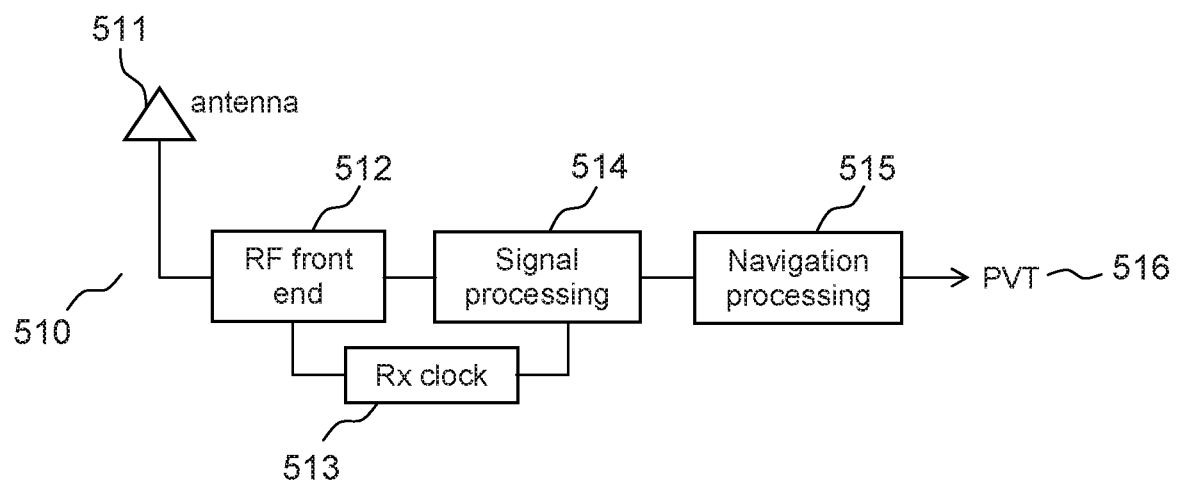
FIGS. 5a and 5b respectively describe the structure of a GNSS receiver (known from the prior art) and of a VLC receiver according to the invention.
Figure 5B:
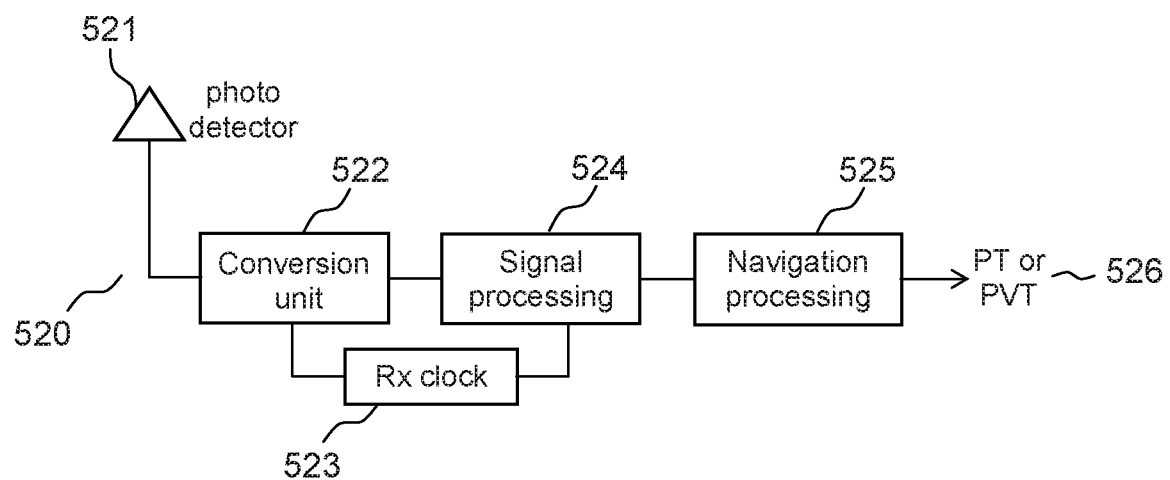

FIGS. 5a and 5b respectively describe the structure of a GNSS receiver (known from the prior art) and the structure of a VLC receiver according to the invention.

A standard GNSS receiver 510 is composed of an antenna 511, receiving radio frequency GNSS positioning signals. A RF front end 512 is in charge of filtering the received signal (which is the sum of all the GNSS positioning signals), transposing it to baseband or intermediate frequency, and converting it to a digital signal. The RF front end is driven by an Rx clock 512. The digital signal is processed by a signal processing unit 514, also driven by the Rx clock 512 and determines pseudo ranges between the receiver and each satellite processed. To identify the various positioning signals, the signal processing unit correlates the received signal with local replicas generated using different pseudo random codes. From the synchronisation value and data comprised in the navigation message, a navigation processing unit 515 can calculate pseudo ranges and Doppler effect values, to retrieve a PVT (position, velocity and time) information 516.

The minimum number of pseudo ranges required for determining a position and time is four, as the number of unknown variables is four: x, y, z and t. Information like the speed of the receiver and the drift of the receiver clock are retrieved in a similar way from the satellites speed and the observed Doppler shift. Additional pseudo ranges can be used to increase the precision of the determination.

A receiver according to the invention 520 is composed, instead or in addition to a GNSS receiver, of a photodetector 521, for receiving optical frequency VLC positioning signals. A conversion unit 522 is in charge of converting the received signal (which is the sum of all the VLC positioning signals) to a digital signal. The conversion unit is driven by a Rx clock 523. The digital signal is processed by a signal processing unit 524, also driven by the Rx clock 523, and determines pseudo ranges between the receiver and each VLC transmitter processed. To identify the various positioning signals, the signal processing unit correlates the received signal with local replicas generated using different pseudo random codes. From the synchronisation value and data comprised in the navigation message, a navigation processing unit 525 can calculate pseudo ranges and Doppler shift values, to retrieve a PVT (position, velocity and time) information 526.

In GNSS, the relative movement between a satellite and the receiver that can be embedded in a vehicle is high. For indoor positioning, as the speed of the receiver is limited, and as the speed of the transmitters is null, the measured Doppler shift might be very low and difficult to estimate. Thus, estimation of the velocity based on that criteria may sometimes be difficult. An alternative solution to this problem is to derive the velocity from successive positioning measurements or to use an inertial measurement unit (hybridized or not with the VLC navigation solution).

As in the GNSS receiver, the minimum number of pseudo ranges required for determining a position and time is of four. However, when the positioning is an indoor one, the value of z might not be necessary. This value may e.g. be known by assessing which VLC transmitters are in view, and deducing from this information which is the current floor, or from other information like information given by a barometric altimeter. Thus, in this use case, the minimum number of pseudo ranges required is of three.

In addition, when the position and time are already acquired, and the receiver is temporally connected with only two positioning signals, its local clock can be propagated (e.g. using last known local clock bias values) so that a position is retrieved from those two positioning signals.

Thus, when the receiver is already synchronized, a minimum of two positioning signals may advantageously be necessary to determine the positioning of a receiver. When the receiver comprises both VLC and GNSS reception modules, the pseudo ranges used to compute the time and position may be calculated from a combination of VLC and GNSS pseudo ranges.

The VLC receiver according to the invention only differs from a standard GNSS receiver by the fact that the antenna+ RF front end is replaced or complemented by a photodetector+conversion unit. The photo detector and conversion unit are somewhat easier to integrate than the antenna and front end, as they do not comprise RF circuitry (filters, mixers, . . . ) with associated sensitivity to EMC, temperature, etc. The photodetector may for example be integrated just beneath a smartphone screen.

Existing solutions, like filters to put on the photodetector, can help dealing with interferences, the interferences being for example lens flare due to the sun or very strong lighting.

The received signal may be processed in a similar way in the VLC receiver according to the invention than in a standard GNSS receiver. The process for determining a position comprises two phases:
- an acquisition phase, wherein the receiver determines which are the received signals by trying different pseudo random sequences, and retrieves their parameters (e.g. code phase, Doppler shift), and
- a signal tracking phase, wherein the receiver tracks and improves the synchronisation on the received signal, in order to provide an accurate measurement, and also decodes the navigation message.

Nevertheless, contrary to the GNSS receivers, the acquisition phase can be achieved very quickly, as the synchronisation value can be searched on a reduced search space. Indeed, the Doppler shift affecting the received signal is reduced as the main sources of Doppler shift are the drifts of the system clock and receiver clock, that depend on the technology employed, and that are very limited (a few Doppler search bins typically). The distance between the transmitters and the receivers being quite small, the transmitters' output power can easily be set to a level at which the achieved SNR is good, at least far better than received GNSS signals SNR. In addition, the bit rate of the decoding message being increased, its decoding can be performed in a very short period of time. As a result, the elapsed time before a position can be estimated is very short (under 0.1 s in an embodiment of the invention).

In terms of processing power, the requirements of a VLC receiver are lower than the requirements of a GNSS receiver, as there is no need to calculate the position of the transmitters (Kepler equations). The operations to perform are limited to:
- discriminating the different VLC positioning signals using their pseudo random code or their transmission frequency,
- calculating a pseudo range for each of these signals,
- decoding the navigation message,
- calculating a PVT using the previous results.

Figure 6A:
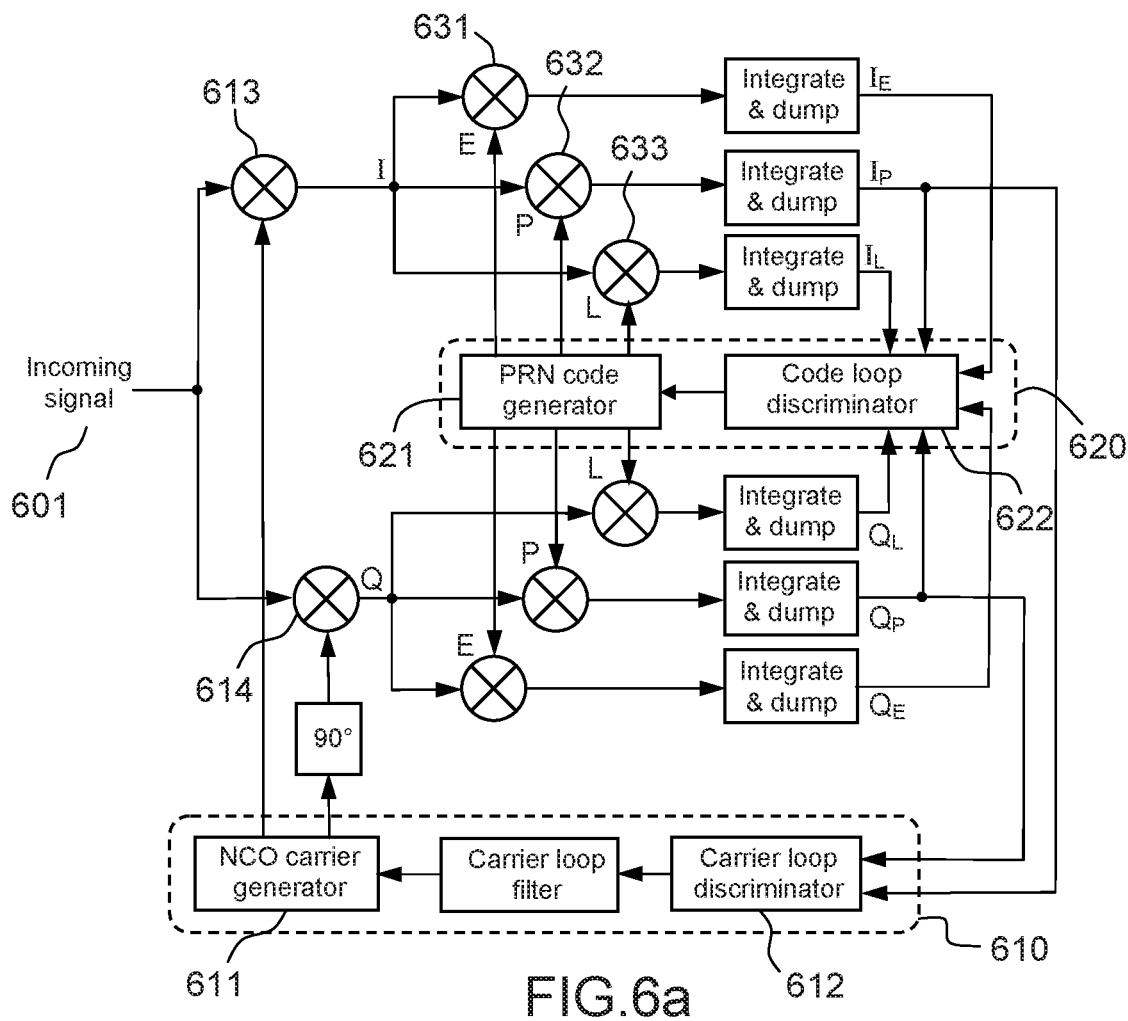
FIGS. 6a and 6b respectively describe a positioning signal tracking loop of a GNSS receiver (known from the prior art) and of a VLC receiver according to the invention.
Figure 6B:
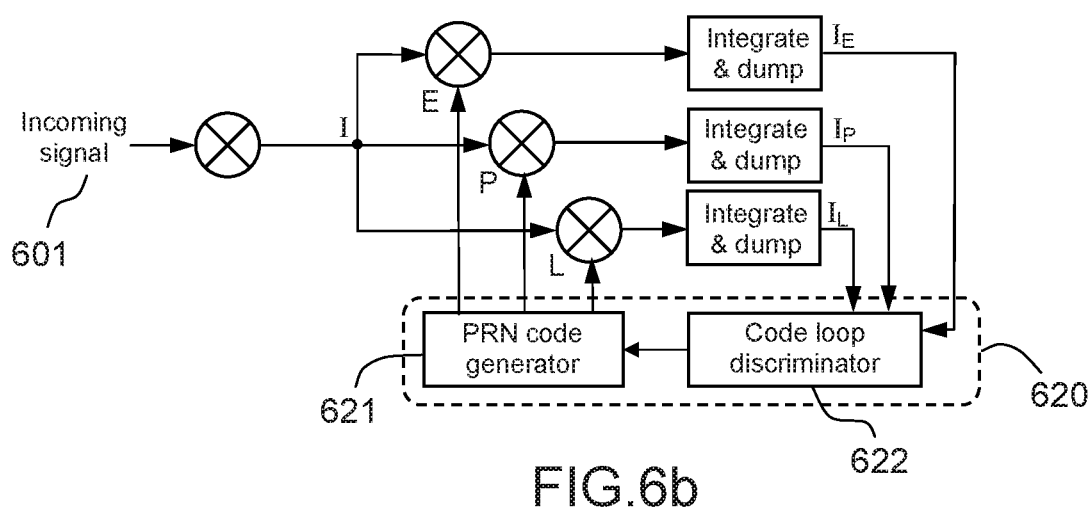

FIGS. 6a and 6b respectively describe a positioning signal tracking loop of a GNSS receiver (known from prior art) and of a VLC receiver according to the invention.

The tracking loop is implemented in the signal processing bloc 514 or 524 of the receiver. Each receiver comprises tracking loops to keep the local replica of the positioning signal synchronized with the received signal after the acquisition phase.

The goal of each tracking loop is to synchronize a local replica of the positioning signal with the incoming signal. Each tracking loop takes as an input a digital signal and a key to generate a pseudo random code (generally a seed for a code generator polynomial).

On FIG. 6a is represented a tracking loop for tracking a GNSS positioning signal. The tracking loop comprises a carrier tracking loop 610, whose main aim is to compensate for impairments due to the Doppler shifts of the incoming signal. A NCO carrier generator 611 generates a carrier corresponding to the estimated Doppler shift, the carrier being summed in phase (613) with the in-phase channel of the incoming signal and in quadrature (614) with the quadrature channel of the incoming signal.

The tracking loop further comprises a code tracking loop 620, whose aim is to synchronize on the received signal spreading code. The code tracking loop comprises a PRN code generator 621, which generates a PRN sequence based on the local time. An early (631), prompt (632) and late (633) positions of the generated code are correlated with the incoming signal. From correlation values of said signals, a code loop discriminator 620 is constructed, that is used to drive the PRN code generator, as known from the person skilled in the art. Correlation values on the prompt position are also used to construct a carrier loop discriminator 612, which is filtered before feeding the NCO carrier generator.

Once the tracking loop is synchronized, a time difference between the time at which the signal was received and the time at which the signal was transmitted can be built to compute a pseudo range.

Concerning the tracking loop in the VLC receiver according to the invention, the signal output by the conversion unit 522 is a pure in-phase baseband signal. Thus, the tracking loop in a receiver according to the invention does not comprise any carrier tracking loop, and is a simplified version of a GNSS receiver tracking loop. The tracking loop is limited to said code generator 621 and code loop discriminator 620 used to drive the code generator. A set of early/prompt/late correlators is depicted for the sake of coherence with previous figures and explanations. It is however well known from the person skilled in the art that a greater number of correlators may be used in some cases.

If an additional compensation of the Doppler shift was required (e.g. some kind of code loop tracking aiding as performed in GNSS receivers, a.k.a. "carrier-aided DLL"), the Doppler shift can be estimated based on the velocity derived from the PVT calculation, or using inertial measurement units (accelerometers and angular rate sensors biases and drifts are estimated using the VLC positioning signal, velocity and heading come from corrected inertial measurement data) embedded on the receiving device.

The advantages of the invention, in addition to already mentioned advantages related to some embodiments, are:
- The invention is specially well suited for indoor positioning, as it is not based on an opportunistic use of a non-navigation signal or on a degraded use of an outdoor navigation signal;
- The invention can also be deployed outdoors;
- Some embodiments of the invention provide seamless transition between a VLC navigation system and a GNSS navigation system;
- Implementation complexity is low: most of the hardware technological bricks or software algorithms can be reused from already existing GNSS technologies:
  - On the transmitter side: VLC transmitters can be replaced or be added to existing light bulbs, the only necessary deployment required being an equipment generating the positioning signal, and linked to the VLC transmitters e.g. via PLC. Maintenance costs are low as limited to changing the light bulbs when out of order, without additional handlings;
  - On the receiver side: as the propagation constraints are lower than in GNSS navigations systems (almost no Doppler, no variations of the propagation time due to the crossing of atmospheric layers), the algorithms to implement on the receiver side can be simplified with respect to the GNSS algorithms. Thus, as hardware bricks and software programs for receiving GNSS signals can be re-used, the invention can be deployed quickly, and at a low cost;
- Use of optical carrier instead of radio frequency carrier show the following advantages:
  - Lower complexity of implementation on the receiver side (no RF-chain),
  - No spectrum regulation: VLC transmissions do not interfere with other electronic devices, and can be used even in restricted places like hospitals, airplanes, etc. . . . .
  - Regarding security, as the signal does not go through walls, the communication is local, secure and confined in a single room, thus providing privacy and security against spoofing. The security can be furthermore improved using proprietary and/or encrypted pseudo random sequences;
  - Multipath interferences (reflected light) might occur, but reflections delayed by more than one chip length will naturally be cancelled out. As the chip rate can be increased (for example 102.3 Mchips/sec instead of 1.023 Mchips/sec), most of the multipath reflections are naturally rejected. Multipath rejection techniques adapted from GNSS techniques can also be implemented;
  - Radio frequency signals used by GNSS navigation systems can be buried in noise, while optical signals are typically not buried in ambient light;
  - The length of the pseudo random chip rate can be adjusted to prioritize the robustness of the transmission, the precision of the positioning, the speed of the acquisition phase or the complexity of the implementation;
- The invention provides a fast decoding of the navigation message, as its bit rate can be increased compared to the bit rate of a GPS navigation message,
  - The navigation message can be specifically designed to further accelerate first fix of the receiver,
  - Considering the parameter values given previously, a total time of about 0.1 s to acquire and track available signals, decode the navigation data and compute a first solution can be reached, depending on characteristics of the VLC positioning signal and hardware receiver;
- The invention provides an accurate positioning, as based on pseudo ranges measurements from a positioning signal comprising time information and a high chip rate,
  - Uncertainties of GNSS positioning due to approximations in the orbit determination of the satellites positions, as well as ionospheric and tropospheric delays, are not applicable,
  - SNR is better than in the radio-frequency receiver case, Increasing the pseudo random sequence chip rate reduces the tracking jitter;

A position error below 0.3 m seems to be realistic, but this precision depends on the localization of the VLC transmitters in the room, The number of simultaneous receivers is unlimited (one-way system).

Figure 7:
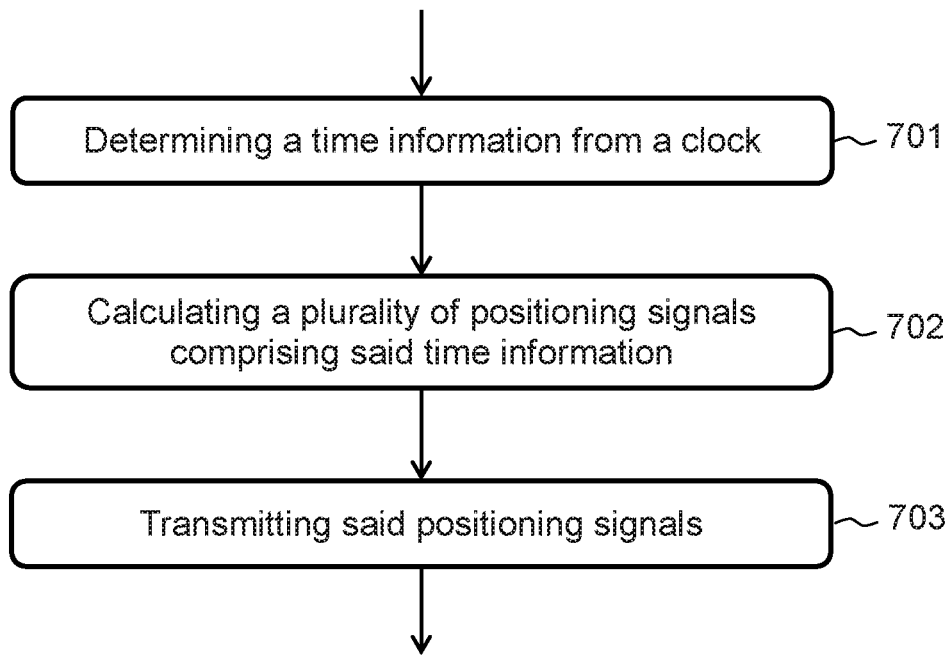
FIG. 7 represents a flow chart of a method according to the invention for transmitting VLC positioning signals.

FIG. 7 represents a flow chart of a method according to the invention for transmitting VLC positioning signals.

The method requires a plurality of VLC transmitters, and a clock information common to all VLC transmitters. Advantageously, the clock is related to a GNSS system time.

The method comprises a first step 701 of determining time information from said clock. This time information may be the time at which the message will be transmitted, or the time corresponding to a specific event in the navigation message frame structure. By way of example, this time information can be the time at which the subsequent TLM field will be transmitted in the navigation message.

The method further comprises a second step 702 of calculating a plurality of positioning signals comprising said time information. The time information is inserted in a navigation message (see FIG. 3b), the time information being modulated by a pseudo random code.

In one embodiment of the invention, a central equipment 231 is responsible for calculating the positioning message. In that case, the central equipment computes a common navigation message containing the time information (and eventually other information like propagation time between the central equipment and the VLC transmitters, navigation information concerning the position in the environment (like floor in a building, position of the VLC transmitters, map of the building) and/or navigation information retrieved from a GNSS positioning system or any other relevant information), and calculates a plurality of different positioning signals by modulating the navigation message for VLC transmitters of a same area with different pseudo random codes.

In another embodiment of the invention, each VLC transmitter is in charge of calculating the positioning message it transmits. From the time information (and eventually other information like propagation time between the central equipment and the VLC transmitters, navigation information concerning the position in the environment (like floor in a building, position of the VLC transmitters, map of the building) and/or navigation information retrieved from a GNSS positioning system or any other relevant information), each VLC transmitter calculates its own positioning message, modulating the navigation message with a pseudo random code different from the pseudo random codes of the VLC transmitters of a same area.

The method also comprises a third step 703 of transmitting said positioning signals using said VLC transmitters.

Figure 8:
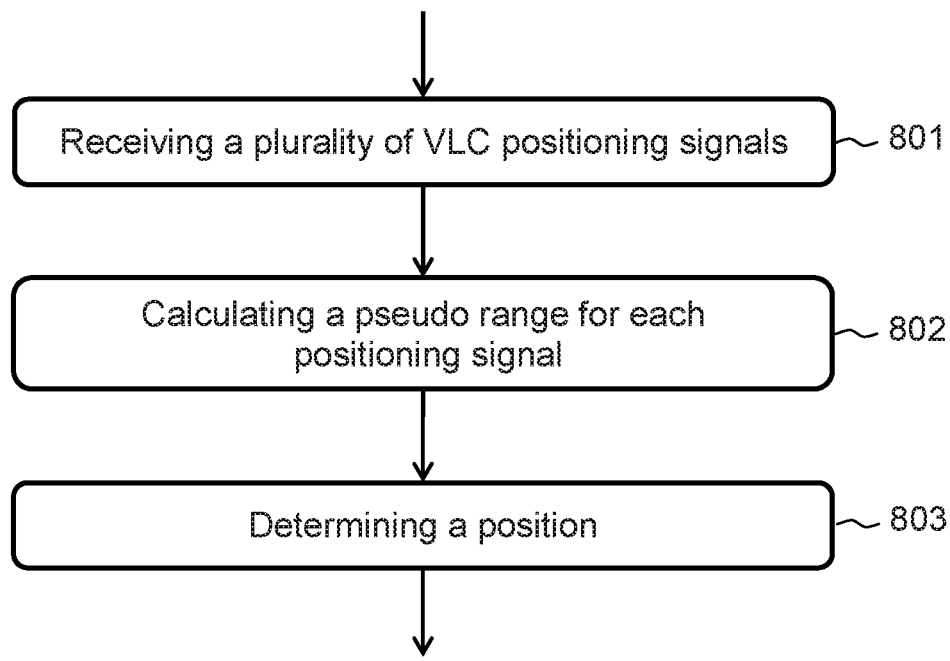
FIG. 8 represents a flow chart of a method according to the invention for calculating a position for VLC positioning signals.

FIG. 8 represents a flow chart of a method according to the invention for calculating a position for VLC positioning signals.

The method applies to a receiver comprising both a VLC receiving chain, to compute a position from VLC transmitters, and a GNSS receiving chain, to compute a position from GNSS transmitters.

The method comprises a first step 801 of receiving a VLC signal on a photo-detector, the VLC signal received being the sum of a plurality of VLC positioning signals, and a GNSS signal on an antenna, the GNSS signal received being the sum of a plurality of GNSS positioning signals.

The method further comprises a second step 802 of calculating, for each of said VLC positioning signals, a pseudo range from said time information with the corresponding VLC transmitter, and for each of said GNSS positioning signals, a pseudo range with the corresponding GNSS transmitter.

To that end, the receiver discriminates the received signals using the pseudo random code or the transmission frequency that is specific to each of the VLC and GNSS transmitters. A tracking loop allows finding a synchronisation between the received signal and a local replica of the signal. From the synchronisation value and the time information comprised in the navigation message transmitted in the positioning signal, a pseudo range, relative to a propagation time between the VLC transmitter and the receiver, can be computed.

This operation is performed the same way on at least two positioning signals to determine a 2D position, on at least three positioning signals to determine a 3D position or a 2D position and a time, on at least four positioning signals to determine a 3D position and a time. Additional pseudo ranges measurements can help improving the accuracy of the estimate.

Thus, the method comprises a third step 803 of determining a position from said calculated pseudo ranges, whether they are calculated from the VLC positioning signals, from the GNSS positioning signals, or from a combination thereof.

To that end, the position of the VLC transmitters must be known. This position may be stored within the device implementing the method, so they advantageously are immediately available. Alternatively, they can be transmitted in the navigation message.

Determining the position can be done resolving a linear equation system to find a PVT solution that satisfies the position of the VLC transmitters and the pseudo ranges calculated, or with any other method known by a person skilled in the art.

The examples disclosed in this specification are only illustrative of some embodiments of the invention. It will be obvious for the man skilled in the art knowing this solution to apply such invention to some other domains. They do not in any manner limit the scope of said invention as defined by the appended claims.

The invention claimed is:

1. A navigation system using Visible Light Communication (VLC), the navigation system comprising one or more GNSS receivers configured to compute a GNSS reference time from GNSS positioning signals, and one or more VLC transmitters configured to transmit a VLC positioning signal comprising a navigation message including time information, where the time information is a transmission time at which a particular field of said navigation message is transmitted by the VLC transmitter, the time information being derived from said GNSS reference time, wherein:
   the one or more GNSS receivers are further configured to retrieve a GNSS navigation message from said GNSS positioning signals, the navigation message of the VLC positioning signals further comprises data comprised in the GNSS navigation message.

2. The navigation system of claim 1, wherein the navigation message is modulated by a pseudo-random sequence said pseudo-random sequence being different for each VLC transmitter within a same area.

3. The navigation system of claim 1, further comprising a central equipment linked to the VLC transmitters and to the one or more GNSS receivers, said central equipment being configured to calculate and send the positioning signals to the VLC transmitters.

4. The navigation system of claim 1, further comprising a central equipment linked to the VLC transmitters and the one or more GNSS receivers, said central equipment being configured to calculate and send said time information to the VLC transmitters.

5. The navigation system of claim 1, wherein each VLC transmitter is connected to a GNSS receiver.

6. The navigation system of claim 1, wherein the bit rate of the navigation message is higher than 500 bits/sec.

7. The navigation system of claim 1, wherein the VLC transmitters are configured to calculate said positioning signals.

8. The navigation system of claim 1, wherein the positioning signals further comprise information about an accuracy of said time information.

9. The navigation system of claim 1, wherein the positioning signals further comprise information about a position of the VLC transmitters.

10. A receiver configured to receive Visible Light Communication (VLC) positioning signals from VLC transmitters and GNSS positioning signals from GNSS transmitters, each positioning signal comprising a navigation message including time information, the time information being a transmission time at which a particular field of said navigation message is transmitted, the receiver being configured to calculate VLC pseudo ranges from the VLC positioning signals and GNSS pseudo ranges from the GNSS positioning signals using said time information, and to determine a position from one or more of said VLC pseudo ranges and GNSS pseudo ranges, wherein said GNSS positioning signals include a GNSS navigation message, the navigation message of the VLC positioning signals further comprises data comprised in the GNSS navigation message.

11. The receiver of claim 10, further comprising a plurality of tracking loops, each of the tracking loops being configured to calculate a reception time from a correlation between one of said received positioning signals and a local replica of said positioning signal, the receiver being further configured to calculate a pseudo range from the calculated reception time and said time information.

12. A method for transmitting Visible Light Communication (VLC) positioning signals in a navigation system comprising a plurality of VLC transmitters and one or more GNSS receivers, the one or more GNSS receivers are configured to retrieve a GNSS navigation message from GNSS positioning signals, said GNSS navigation message includes time information, the method comprising, for each VLC transmitter:

determining a time information relative to a transmission time of a field of a navigation signal to be transmitted within a VLC positioning signal, wherein said VLC navigation message includes data comprised in said GNSS navigation message, and said time information being derived from a reference time acquired from said one or more GNSS receivers, calculating said VLC positioning signal comprising said time information, and transmitting said VLC positioning signal.

13. The method of claim 12, wherein calculating said VLC positioning signal comprises calculating a navigation message including said time information, and modulating said navigation message with a pseudo-random sequence, said pseudo-random sequence being different for each VLC transmitter within a same area.

14. A method for determining a position from one or more Visible Light Communication (VLC) positioning signals transmitted by VLC transmitters comprising a navigation message including time information and one or more GNSS positioning signals transmitted by GNSS transmitters comprising a GNSS navigation message including time information, the method comprising:

receiving said VLC positioning signals and said GNSS positioning signals from said VLC transmitters and said GNSS transmitters, said navigation message of the VLC positioning signal further comprises data comprised in said GNSS navigation message, calculating, for each of said received signals, a pseudo range from said time information with corresponding said VLC transmitter and said GNSS transmitter, and determining a position from said calculated pseudo ranges.

* * * * *